(12) United States Patent
Boonphupontonti

(10) Patent No.: US 11,402,021 B2
(45) Date of Patent: Aug. 2, 2022

(54) LIFTING BELLOWS

(71) Applicant: ContiTech Luftfedersysteme GmbH, Hannover (DE)

(72) Inventor: Atipong Boonphupontonti, Northeim (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 207 days.

(21) Appl. No.: 16/618,117

(22) PCT Filed: Mar. 1, 2018

(86) PCT No.: PCT/EP2018/054998
§ 371 (c)(1),
(2) Date: Nov. 28, 2019

(87) PCT Pub. No.: WO2018/219507
PCT Pub. Date: Dec. 6, 2018

(65) Prior Publication Data
US 2020/0141490 A1    May 7, 2020

(30) Foreign Application Priority Data
May 30, 2017   (DE) .................. 10 2017 209 038.3

(51) Int. Cl.
*F16J 3/04*       (2006.01)
*B60G 11/27*      (2006.01)
(Continued)

(52) U.S. Cl.
CPC .............. *F16J 3/041* (2013.01); *B60G 11/27* (2013.01); *F16F 9/0409* (2013.01); *F16J 12/00* (2013.01)

(58) Field of Classification Search
CPC .......... F16F 9/0409; F16F 9/0454; F16F 9/05; F16J 3/041; B60G 11/27; B60G 17/0521; B29D 22/023
See application file for complete search history.

(56) References Cited

U.S. PATENT DOCUMENTS 3,040,383 A * 6/1962 Nassimbene ........ B29D 22/023
                                                156/222
3,319,952 A * 5/1967 Travers ................. F16F 9/0454
                                                267/64.27
(Continued)

FOREIGN PATENT DOCUMENTS

| DE | 8816538 U1 | 10/1989 |
| EP | 0262080 A2 | 3/1988 |

OTHER PUBLICATIONS

International Search Report dated May 25, 2018 of international application PCT/EP2018/054998 on which this application is based.

*Primary Examiner* — Thomas W Irvin
(74) *Attorney, Agent, or Firm* — Gregory Adams; David L. Cate

(57) ABSTRACT

The invention relates to a lifting bellows (1), for example for axle-lifting apparatuses of vehicles. The invention is based on the object of creating a lifting bellows (1) which is lightweight and of simple construction and which can be produced inexpensively. The object is achieved by virtue of the fact that the lifting bellows (1) has at least one hose-shaped elastomer main body (2) with an elastomer matrix and has reinforcing supports (6, 7) embedded in the elastomer matrix, two end covers (3, 3A) and two clamping elements (4), wherein the reinforcing support (6, 7) of the main body (2) is built up from at least two thread plies (6, 7), wherein each thread ply (6, 7) is arranged, in the non-loaded state, at a winding angle (11A, 11B) with respect to the circumferential direction, the absolute value of which (Continued)

Figure 1:
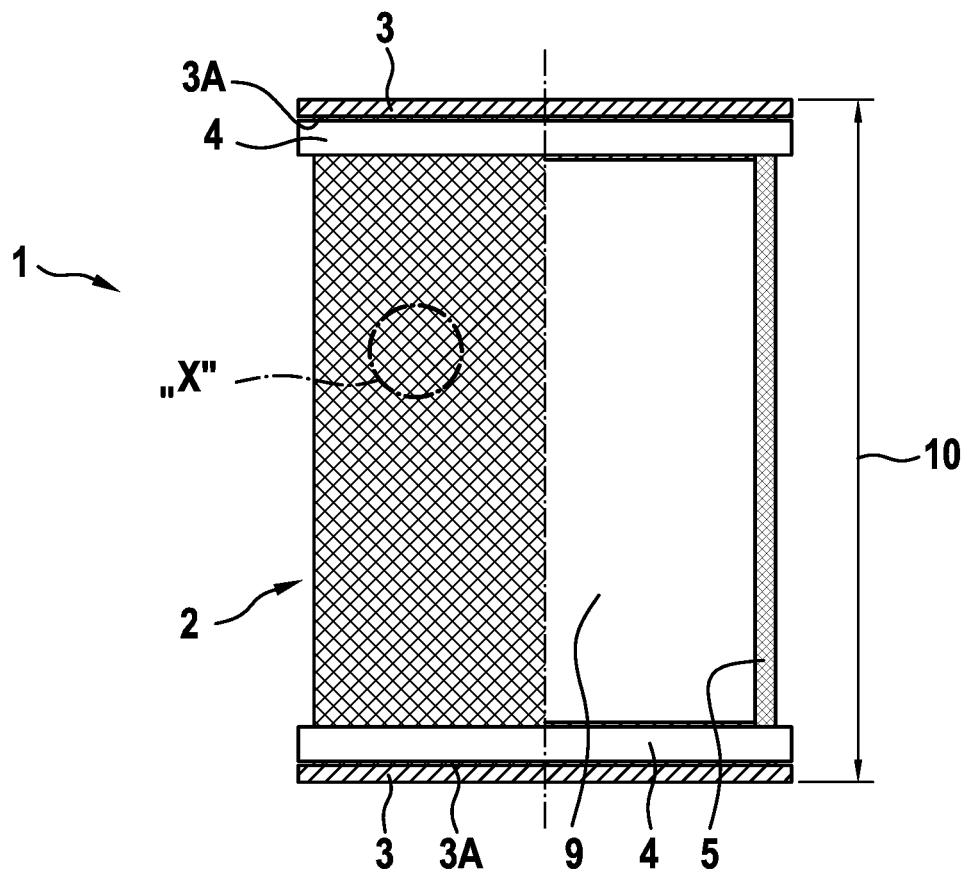
Figure 1:
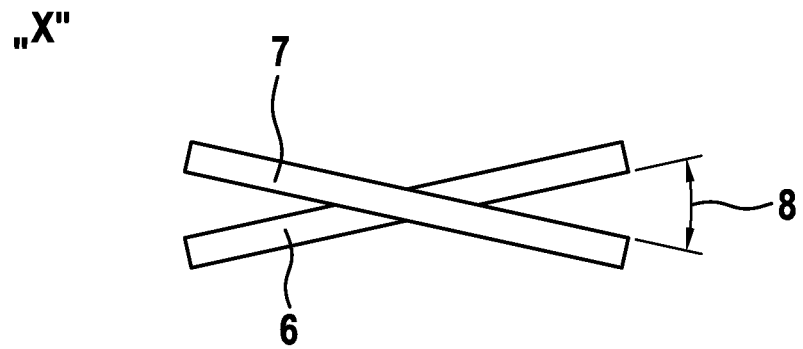

winding angle (11A, 11B) is less than 35.3°, wherein the two winding angles (11A, 11B) have virtually the same absolute value but different signs, and that the end covers (3, 3A) are each connected at both ends to the main body (2) in an air-tight fashion by means of the clamping elements (4).

12 Claims, 4 Drawing Sheets

(51) Int. Cl.
*F16F 9/04* (2006.01)
*F16J 12/00* (2006.01)

(56) References Cited

U.S. PATENT DOCUMENTS

| | | | | |
|---|---|---|---|---|
| 3,403,603 A * | 10/1968 | Turner | ............ | F16J 3/06 92/99 |
| 3,666,598 A * | 5/1972 | Christie et al. | ....... | B29C 70/326 156/361 |
| 3,897,941 A * | 8/1975 | Hirtreiter | ............ | F16F 9/0409 267/64.24 |
| 3,970,495 A * | 7/1976 | Ashton | ............ | B29C 33/52 156/162 |
| 4,118,262 A * | 10/1978 | Abbott | ............ | B29C 53/60 156/175 |
| 4,763,883 A * | 8/1988 | Crabtree | ............ | F16J 3/06 267/64.27 |
| 4,921,226 A * | 5/1990 | Pees | ............ | F16F 9/084 267/64.21 |
| 4,988,082 A * | 1/1991 | Pees | ............ | B29D 22/02 267/122 |
| 5,080,328 A * | 1/1992 | Pees | ............ | B29D 22/02 267/122 |
| 5,201,499 A * | 4/1993 | Elliott | ............ | F16F 9/0409 267/64.27 |
| 5,286,010 A * | 2/1994 | Pahl | ............ | F16F 9/0409 267/122 |
| 5,566,929 A * | 10/1996 | Thurow | ............ | F16F 9/0409 267/64.24 |
| 5,975,506 A * | 11/1999 | Thurow | ............ | B60G 11/27 267/64.21 |
| 6,431,557 B1 * | 8/2002 | Terborn | ............ | B60G 9/02 280/5.507 |
| 6,464,212 B2 * | 10/2002 | Lutz | ............ | F16F 9/092 138/30 |
| 7,063,308 B2 * | 6/2006 | Binder | ............ | F16F 9/0409 267/64.27 |
| 7,837,181 B2 * | 11/2010 | Reck | ............ | F16F 9/0409 267/64.27 |
| 7,926,794 B2 * | 4/2011 | Thurow | ............ | F16F 9/0409 267/64.24 |
| 9,162,687 B2 * | 10/2015 | Bujeau | ............ | B61F 5/10 |
| 9,267,566 B2 * | 2/2016 | Nair | ............ | B60C 15/0628 |
| 10,690,209 B2 * | 6/2020 | Vazquez Fernandez | . | F16F 9/05 |
| 2004/0041313 A1 | 3/2004 | Crabtree | | |
| 2004/0130080 A1 * | 7/2004 | Binder | ............ | F16F 9/0409 267/64.27 |
| 2004/0211508 A1 * | 10/2004 | Berger | ............ | B29D 22/023 156/171 |
| 2006/0117843 A1 * | 6/2006 | Reck | ............ | F16F 9/0409 73/161 |
| 2007/0205545 A1 * | 9/2007 | Thurow | ............ | F16F 9/0409 267/64.24 |
| 2013/0183483 A1 * | 7/2013 | Nair | ............ | B29C 48/08 428/114 |
| 2020/0238777 A1 * | 7/2020 | Delorenzis | ............ | F16F 9/05 |
| 2021/0061038 A1 * | 3/2021 | Heon | ............ | F16F 9/0427 |

\* cited by examiner

LIFTING BELLOWS

The invention relates to a lifting bellows, for example for axle-lifting apparatuses of vehicles.

Lifting bellows made from elastomer material are known per se and are in use. They are used in machine or foundation supports to compensate height differences or in vehicles, especially commercial vehicles, to lift axles which are sometimes not required.

Lifting bellows according to the prior art are generally either designed as rolling bellows, similar to a rolling bellows air spring, or often as a concertina bellows with one or more folds.

DE 88 16 538 U1 discloses an axle-lifting apparatus in which the lifting bellows is disclosed in both embodiments.

The embodiments mentioned are both relatively complex since, on the one hand, a large number of components, such as flange plates or rolling contact pistons are necessary and, on the other hand, the production of the bellows themselves is expensive since bead cores made of metal are generally required in production and these have to be made available separately and inserted into the molds during production. Moreover, the lifting bellows mentioned are quite heavy.

The invention is based on the object of creating a lifting bellows which is lightweight and of simple construction and which can be produced inexpensively.

This object is achieved by virtue of the fact that the lifting bellows has at least one hose-shaped elastomer main body with an elastomer matrix and has reinforcing supports embedded in the elastomer matrix, two end covers and two clamping elements, wherein the reinforcing support of the main body is built up from at least two thread plies, wherein each thread ply is arranged, in the non-loaded state, at a winding angle with respect to the circumferential direction, the absolute value of which winding angle is less than 35.3°, wherein the two winding angles have virtually the same absolute value but different signs, and that the end covers are each connected at both ends to the main body in an air-tight fashion by means of the clamping elements.

Since the winding angles of the thread plies each have the same absolute value but a different sign, a thread angle between the two thread plies which is twice the absolute value of the respective winding angle is obtained from this in the finished bellows. Accordingly, the absolute value of the thread angle according to the invention is 2×35.3° in this case. Thus, the thread angle has an absolute value of less than 70.6°.

If a bellows of this kind with a winding angle of 35.3° is supplied with compressed air, the forces which act on the ends are in balance with the forces which are absorbed by the bellows wall and there is an equilibrium of forces. This is therefore the neutral angle which a corresponding bellows will tend to adopt under internal pressure. If the winding angle of the non-loaded bellows is less than 35.3°, the bellows will consequently have to stretch to achieve this angle.

A bellows of this kind is therefore suitable for lifting loads. Since only a small number of simple components that are easy to produce is required, a lifting bellows of this kind can be produced inexpensively and has only a relatively low weight.

In a development of the invention, the absolute value of the winding angle has a value of less than 27.5°.

In a development of the invention, the absolute value of the winding angle has a value of less than or equal to 20°.

The smaller the winding angle and hence the thread angle, the greater will be the extension of the lifting bellows under load. Thus, even longer lifting travels can be achieved.

Figure 2:
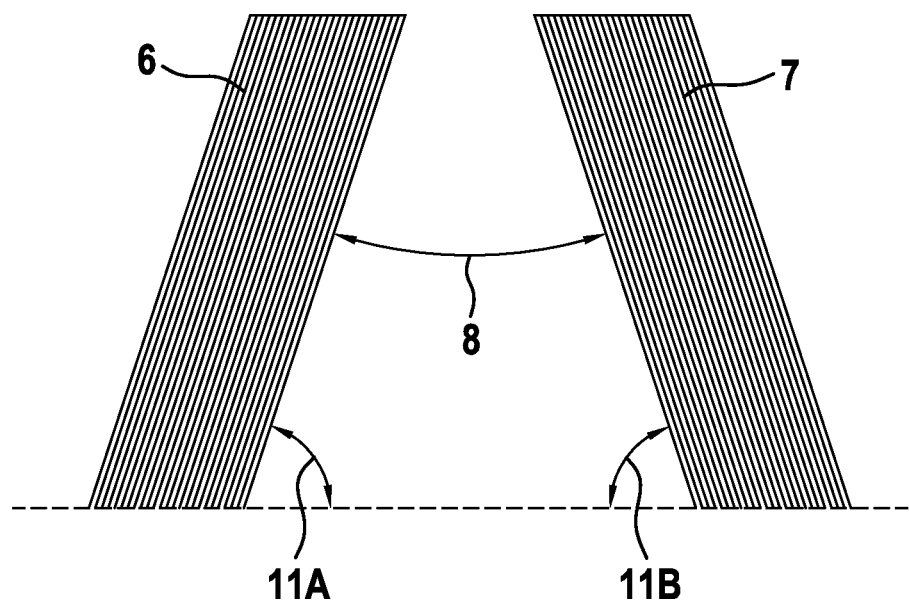
Figure 3:
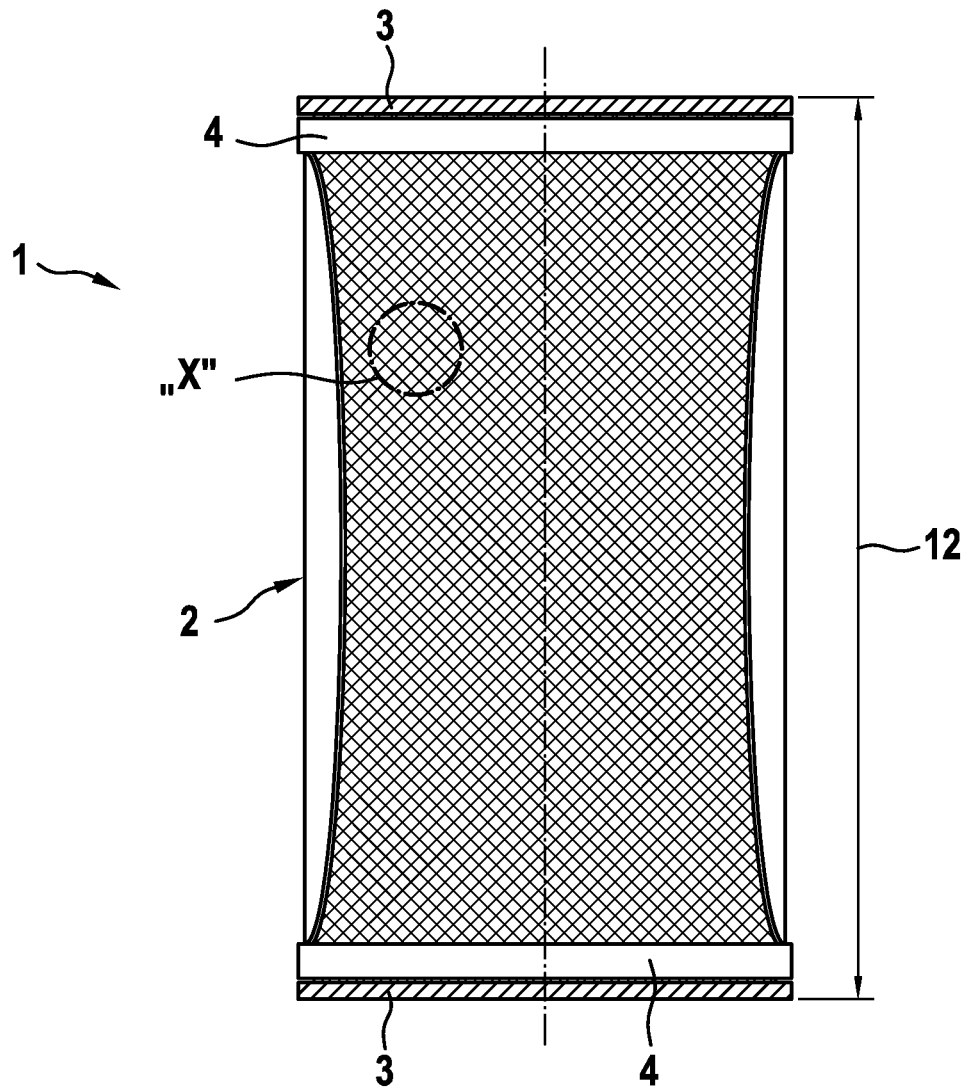
Figure 3:
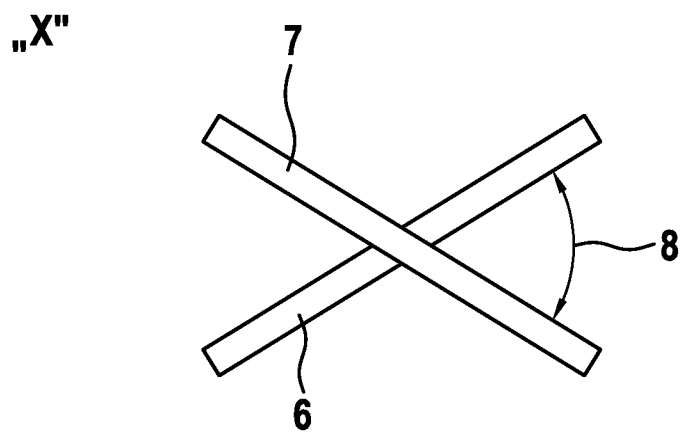
Figure 4:
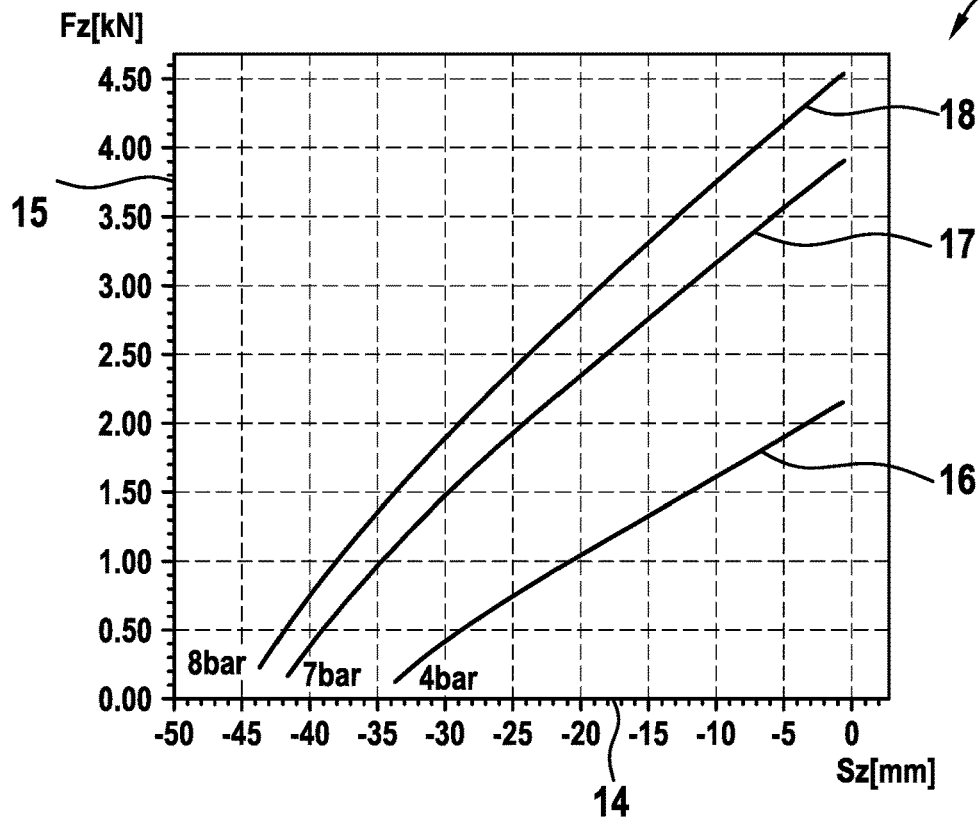
Figure 4:
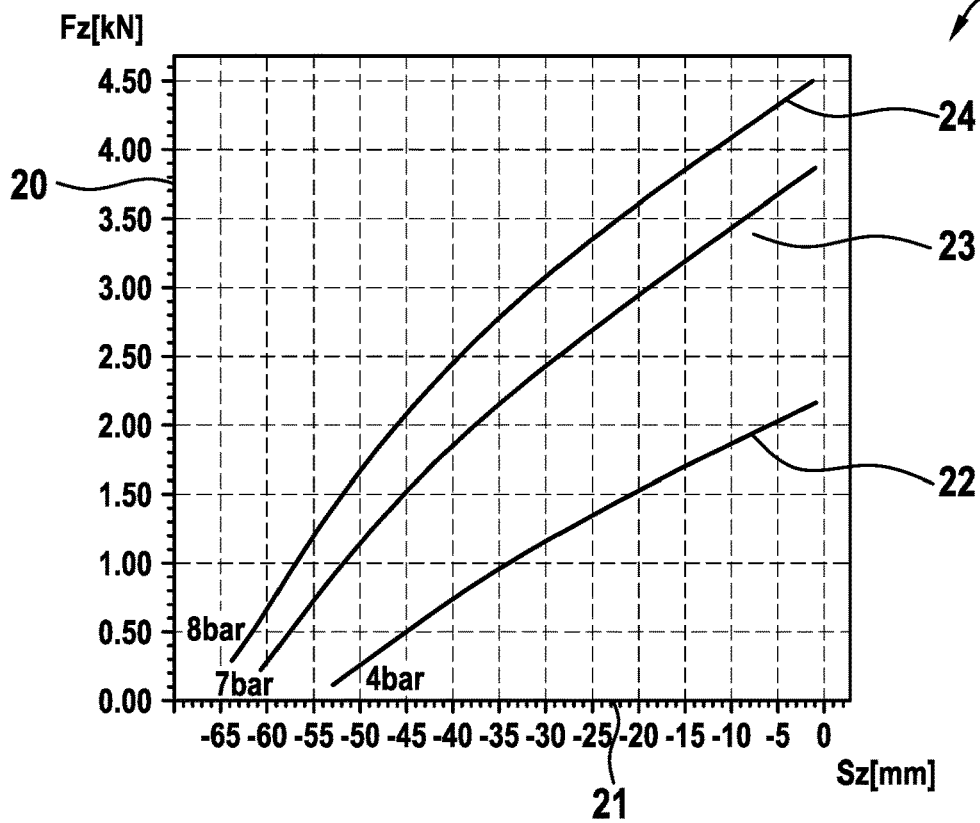

An example of the invention will be explained in more detail below on the basis of the drawing. In the drawing:

FIG. 1 shows a lifting bellows according to the invention in a partial longitudinal section in a non-loaded state, FIG. 2 shows a diagrammatic illustration of the difference between the winding angle and the thread angle, FIG. 3 shows the lifting bellows according to the invention in a schematic diagram with pressure applied, and FIG. 4 shows two diagrams of lifting force/lifting travel characteristics of lifting bellows according to the invention.

FIG. 1 shows a lifting bellows 1 according to the invention in a partially sectioned illustration. The lifting bellows 1 has an elastomer main body 2. The main body 2 is closed at each of the ends by an end cover 3 made of plastic, wherein the plastic cover 3 is inserted by means of a respective shoulder 3A into the main body 2. The main body 2 is clamped firmly on the shoulder 3A of the plastic cover 3 by a clamping ring 4. The main body 2 has a wall 5, which is here illustrated as a section in the right-hand half of FIG. 1. The wall 5 has an elastomer matrix (not illustrated specifically), into which a reinforcing support is embedded.

The reinforcing support is shown in greater detail in an enlarged detail "X". It comprises two thread plies 6 and 7, of which only one thread 6 and one thread 7 are shown and the surrounding elastomer matrix is not shown in the enlarged detail "X". The thread plies 6 and 7 cross over each other, when viewed in the circumferential direction of the main body 2, at a thread angle 8, which is not to scale in this illustration. The thread angle 8 is less than 2×35.3°. The internal volume 9 of the lifting bellows 1, said volume being closed in an air-tight fashion by the end covers 3, can be supplied with compressed air via an air port (not shown). In the unpressurized state, the lifting bellows has a height 10.

To illustrate the principle underlying the relationship between the winding angle and the thread angle 8, FIG. 2 shows the thread plies 6 and 7 together. For greater clarity, intersections between the thread plies 6, 7 are not shown. Thread ply 6 has a winding angle 11A, and thread ply 7 a winding angle 11B, relative to the circumferential direction. In terms of the absolute value, the winding angles 11A, 11B are equal but have a different sign, and therefore $$11A = -11B \text{ and}$$

$$|11A| = |11B|.$$

Accordingly, the resulting thread angle 8 in the example under consideration is less than $$|11A| + |11B| = 70.6°$$

FIG. 3 shows the lifting bellows 1 according to the invention in an internal volume supplied with compressed air. The internal volume is not illustrated explicitly here. Here too, the thread plies 6 and 7 are represented respectively by a thread 6 and a thread 7 and are shown in greater detail in the enlarged detail "X". The elastomer matrix is not illustrated explicitly.

When the main body 2 is pressurized, the thread angle 8 tends toward the neutral angle of 2×35.3°. Since the thread angle 8 has a value of less than 2×35.3° in the non-loaded state, the thread angle 8 is increased when pressure is applied. This has the effect that the height 12 of the bellows is increased as compared with the unpressurized state. This extension of the lifting bellows 1 can be used as a stroke in a corresponding apparatus (not shown here).

FIG. 4 shows two diagrams 13 and 19 of lifting force/lifting travel characteristics of lifting bellows according to the invention.

Diagram 13 shows the achievable final heights for a lifting bellows according to the invention with an initial height of 100 mm and a winding angle of 27.5° as a function of the internal pressure. Axis 14 of diagram 13 represents the extension in mm, while axis 15 represents the load capacity in kN.

Curve 16 shows the lifting force/lifting travel characteristic at an internal pressure of 4 bar. Here, a maximum extension of about 34 mm can be achieved, wherein the load capacity falls to a value close to zero at the maximum extension.

Curve 17 shows the lifting force/lifting travel characteristic at 7 bar with a maximum extension of about 42 mm, and curve 18 shows the characteristic at 8 bar with a maximum extension of about 44 mm.

Lifting force/lifting travel characteristics 22, 23 and 24 for a lifting bellows with an initial length of 100 mm and a winding angle of 20° are shown in diagram 19 with axis 20 for the extension in millimeters and axis 21 for the load capacity in kN. It can be seen that the achievable maximum extensions of the lifting bellows as a function of the internal pressure are even greater than with a thread angle of 27.5°, namely approximately 54 mm at 4 bar in curve 22, approximately 61 mm at 7 bar in curve 23, and approximately 64 mm at 8 bar in curve 24.

Thus, with the lifting bellows according to the invention, large lifting heights can be achieved in accordance with the thread angle in combination with a simple and lightweight construction. Moreover, by virtue of the compact construction, only a small amount of installation space is required.

LIST OF REFERENCE SIGNS

Part of the Description

1 Lifting bellows
2 Main body of the lifting bellows 1
3 End cover
3A Shoulder of the end covers 3
4 Clamping ring
5 Wall of the main body 2
6, 7 Thread plies, threads of the thread plies
8 Thread angle
9 Internal volume of the lifting bellows 1
10 Height of the non-loaded lifting bellows 1
11A, 11B Winding angle of the thread plies 6, 7
12 Height of the pressurized lifting bellows 1
13, 19 Diagrams of lifting force/lifting travel characteristics of lifting bellows 1 according to the invention
14, 20 Vertical axis of diagrams 13, 19
15, 21 Load capacity axis of diagrams 13, 19
16, 17, 18 Lifting force/lifting travel characteristics at a thread angle of 27.5°
22, 23, 24 Lifting force/lifting travel characteristics at a thread angle of 20°

The invention claimed is:

1. A lifting bellows comprising:
at least one hose-shaped elastomer main body with an elastomer matrix and has reinforcing supports embedded in the elastomer matrix;
two end covers;
two clamping elements;
wherein the reinforcing support of the main body is built up from at least two thread plies, wherein each thread ply is arranged, in a non-loaded state, at a winding angle with respect to the circumferential direction, the absolute value of the winding angle is less than 35.3°, wherein the two winding angles have virtually the same absolute value but different signs, and the end covers are each connected at both ends to the main body in an air-tight fashion by means of the clamping elements; and
the winding angle has an absolute value of less than 27.5°.

2. The lifting bellows as claimed in claim 1, wherein the at least two thread plies define a thread angle based on the winding angle.

3. The lifting bellows as claimed in claim 2, wherein the thread angle increases on transition from the non-loaded state to a loaded state.

4. The lifting bellows as claimed in claim 1, further comprising a loaded state where an extension of the lifting bellows in the loaded state is based on the winding angle in the non-loaded state and an internal pressure.

5. The lifting bellows as claimed in claim 1, wherein the lifting bellows is utilized for axle-lifting apparatuses of vehicles.

6. A lifting bellows comprising:
at least one hose-shaped elastomer main body with an elastomer matrix and has reinforcing supports embedded in the elastomer matrix;
two end covers:
two clamping elements;
the reinforcing support of the main body is built up from at least two thread plies, wherein each thread ply is arranged, in a non-loaded state, at a winding angle with respect to the circumferential direction, the absolute value of the winding angle is less than 35.3°, wherein the two winding angles have virtually the same absolute value but different signs, and the end covers are each connected at both ends to the main body in an air-tight fashion by means of the clamping elements; and
wherein the winding angle has an absolute value of less than or equal to 20°.

7. An elastomer main body for a lifting bellows comprising:
a first end;
a second end;
a wall having an elastomer matrix disposed between the first end and the second end and having a first thread plie and a second thread plie that cross over each other and have a non-loaded winding angle in a non-loaded state and a loaded winding angle in a loaded state and define a non-loaded thread angle in the non-loaded state and a loaded thread angle in the loaded state; and
wherein the wall extends by an extension amount from the non-loaded state to the loaded state based on the non-loaded winding angle and an internal pressure; and
the winding angle has an absolute value of less than 27.5° in the non-loaded state.

8. The elastomer main body of claim 7, further comprising an air port configured to supply compressed air.

9. The elastomer main body of claim 7, wherein the loaded winding angle is greater than the non-loaded winding angle.

10. The elastomer main body of claim 7, wherein loaded thread angle tends toward a neutral angle of twice the non-loaded winding angle.

11. The elastomer main body of claim 7, further comprising first and second end covers attached to the first and second ends of the elastomer main body.

12. The elastomer main body of claim 7, wherein the extension amount is used as a stroke for an apparatus.

* * * * *